United States Patent

Ernst et al.

[15] 3,659,139

[45] Apr. 25, 1972

[54] HOLLOW ELECTRODE ASSEMBLY OF CARBON HAVING DENSED GRAPHITE JUNCTION NIPPLE

[72] Inventors: Hans Ernst, Meitingen near Augsburg; Jürgen Semmler, Donauworth; Otto Vohler, Nordendorf uber Donauworth; Ottmar Rubisch, Meitingen near Augsburg, all of Germany

[73] Assignee: Sigri Elektrographit Gesellschaft mit beschrankter Haftung, Meitingen near Augsburg, Germany

[22] Filed: Sept. 18, 1969

[21] Appl. No.: 859,128

[30] Foreign Application Priority Data

Sept. 23, 1968 Germany.....................P 17 90 172.3

[52] U.S. Cl.............................313/357, 287/127 E, 313/354
[51] Int. Cl...........................................................H01j 1/00
[58] Field of Search......................313/354, 357; 287/127 E

[56] References Cited

UNITED STATES PATENTS

| 1,912,560 | 6/1933 | Wiles | 287/127 E UX |
| 2,120,243 | 6/1938 | Droll | 313/354 X |
| 3,055,789 | 9/1962 | Gemmi | 287/127 E UX |
| 3,187,089 | 6/1965 | Cosky et al | 313/354 UX |
| 3,399,322 | 8/1968 | Ambe | 313/354 X |
| 3,406,993 | 10/1968 | Haynes | 287/127 E |

*Primary Examiner*—David Schonberg
*Assistant Examiner*—Toby H. Kusner
*Attorney*—Curt M. Avery, Arthur E. Wilfond, Herbert L. Lerner and Daniel J. Tick

[57] ABSTRACT

A hollow electrode assembly of industrial carbon comprises coaxially sequential electrode members with a central through-bore lined by an inner tube of carbon in each member. Each two sequential electrode members are rigidly joined with each other by a nipple, preferably of double-conical shape, which enters into respective socket recesses in the adjacent electrode members. The inner tubes of the electrode members are rigidly and gastightly connected with each other. Preferably, the connecting nipple is also lined with an inner tube which enters into a close telescoping seating relation with the adjacent ends of the respective electrode members.

3 Claims, 6 Drawing Figures

Patented April 25, 1972

Patented April 25, 1972

Patented April 25, 1972

HOLLOW ELECTRODE ASSEMBLY OF CARBON HAVING DENSED GRAPHITE JUNCTION NIPPLE

Our invention relates to hollow electrodes made of industrial carbon, i.e. carbon or graphite, and more particularly to assemblies composed of electrodes with an axial through-bore lined with an inner tube of carbon, and connecting nipples which interconnect the sequential electrode members and are also provided with an axial bore.

Hollow electrodes of carbon or graphite are known for use in arc furnaces where the hollow type of electrode reduces line power disturbances and permits increasing the smelting capacity of the furnace while reducing its power consumption. It is further known to join such hollow electrodes by nipple screw junctions so as to form a continuous electrode strand, the nipples being either hollow, full-bodied, or partially bored through. It is also known to use the bore of such a strand assembly for supplying or discharging a coolant or reaction agent.

Since an increased amount of burn-off occurs at the bores of such hollow electrodes, it has further become known to line the bores in the electrodes and nipples by inner tubes of graphite whose inner surface is coated for protection from burn-off.

Our invention is predicated upon the observation that when the bore of such electrodes is used for supplying gaseous substances to the arc, only a small portion of the gas entered into the bore will actually reach the arc. It is an object of our invention, therefore, to obviate this disadvantage.

To this end, and in accordance with a feature of our invention, we provide a hollow electrode of the above-mentioned type and interconnect the inner tubes so as to densely and gastightly join them with each other.

Preferably, and in accordance with another feature of our invention, we employ for this purpose a nipple of dense graphite with an axial through-bore, or a nipple into whose bore a dense tube is inserted; and we join this dense nipple tube or the dense nipple itself tightly with the inner tubes which form the linings in the bores of the electrode members joined by the nipple.

According to still another feature of our invention, the tight connection between the nipple bore and the electrode bore is preferably secured by having the inner tubes of the electrode members protrude beyond the socket bottom and somewhat into the socket space of the electrodes, and giving these inner tubes a diameter smaller than that of the inner tube of the nipple, or that of the nipple bore if the nipple is made of graphite or the like highly dense carbon material. Consequently, the protruding ends of the tubes which line the bores of the electrode members extend and tightly fit into the bores or tubular linings of the nipples.

According to another, alternative feature of our invention, the nipples are provided with inner tubes which protrude beyond the end faces of the nipples and whose diameter is smaller than that of the inner tubes which line the bores of the electrode members, so that the nipple inner tubes protrude some distance into the inner tubes of the electrode members and are tightly and sealingly joined therewith.

If desired, a tight seal at the butt junction may also be secured additionally by providing at this locality a ring of cement which becomes fluid at elevated temperature and which consists, for example, of pitch having a high carbon content. The cement material may also contain synthetic resin, for example phenol or furan resin mixed with graphite powder.

A further improvement of the gastight seal is obtainable by coating the jacket surface of the electrode members with a sealing coat constituted of a silicide of a transition metal having a layer thickness of 0.1 to 0.8 mm. To provide for good sealing between sequential members, a sealing ring of similar composition is preferably provided in the vicinity of the outer periphery of the electrode members.

It has been found particularly advantageous to insert a sealing tube into the bore of the electrode members and the nipple, and to interconnect the individual portions of this tube by a screwed, pressed, or cemented junction. To prevent these tubes from sliding through the electrode, the thermal coefficient of radial expansion of the tube material should be larger than or equal to that of the electrode material. Due to such difference in thermal expansion and also because the temperature is highest in the center of the electrode, the inner tube always expands more than the electrode bore so that the hot inner tube forcefully adheres to the wall of the bore.

For further elucidating the invention, reference will be made to embodiments of electrode assemblies according to the invention illustrated by way of example in the accompanying drawings, in which.

Figure 1:
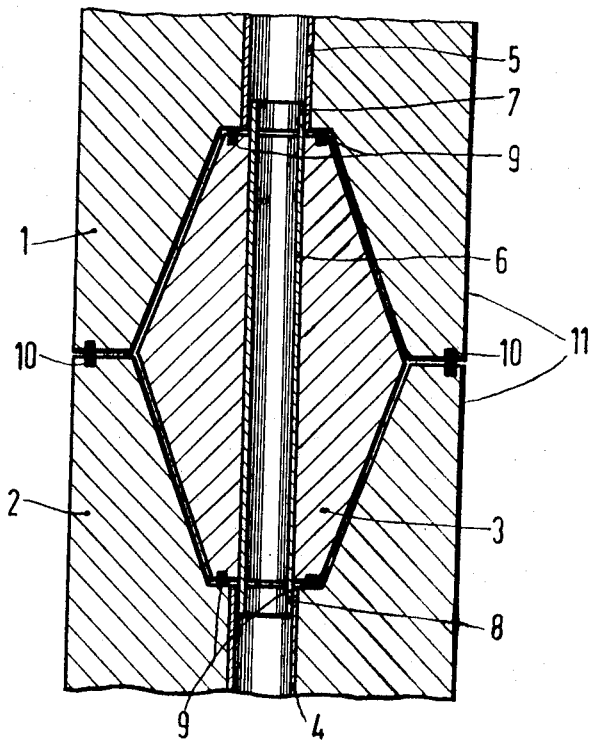
FIG. 1 illustrates in diametrical section an electrode-nipple junction which exemplifies different ways of sealing the internal hollow space.

According to FIG. 1, two electrode members 1 and 2 are rigidly and gastightly connected with each other by a double-conical nipple 3 which engages respective conical socket recesses in the ends of the respective electrode members. The electrode members 1 and 2 have axial bores into which dense inner tubes 4 and 5 of graphite are inserted. The nipple 3 also has a dense inner tube 6 of graphite. For providing a tight connection between the inner tubes 4, 5 and 6 at the junction localities 7 and 8, the tubes 4 and 5 overlap the nipple tube 6. That is, the tubular lining of the nipple protrudes beyond the nipple end faces and is inserted with a tight fit into the ends of the electrode inner tubes 4 and 5. The sealing of these localities is further improved by sealing rings 9 of fusable cement located in the vicinity of the junction places 7, 8. The rings 9 consist of pitch which has a high carbon content and may also be mixed with synthetic resin, for example phenol or furan resin with an admixture of graphite powder, and, if necessary, a driving or swelling agent. When the nipple junction is heated during operation of the electrode strand, any remaining voids at the junction localities are completely filled by the flow of the then softening cement mixture, whereafter the rings 9, during further heating of the electrode assembly, are carbonized and converted to coke.

A further sealing effect is obtained by placing dense coatings 11 upon the cylindrical surfaces of the electrode members 1 and 2. The coatings 11 are produced, for example, by depositing a silicide of a transition metal in a layer thickness of 0.1 to 0.6 mm. The coating may be composed of one to three, preferably two, layers in order to attain the desired degree of gastightness. In conjunction with such a jacket coating on the electrode members, it is preferable to provide a cement quantity 10 in form of a ring between the end faces of the electrode members. The ring 10 constitutes a reservoir of material which becomes soft or fluid at increasing temperature and secures a dense and gastight connection between the butt faces.

Figure 2:
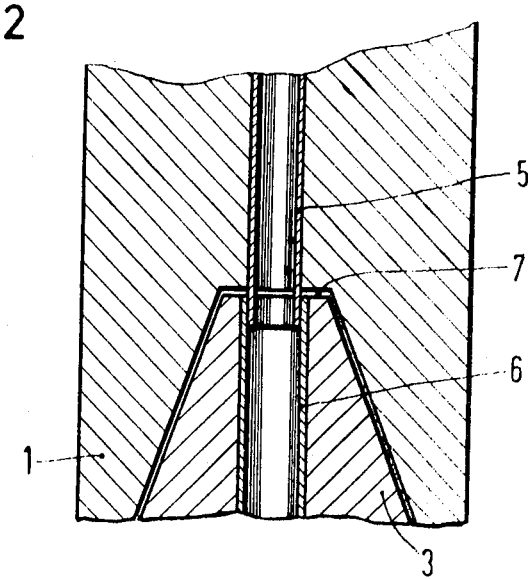
FIGS. 2 to 5 illustrate, partially and in diametrical section, four different other embodiments and correspondingly different ways of providing for a tight connection and seal between the inner tubes of the electrode members and the inner tubes of the nipples.

Instead of having the inner tube 6 of the nipple 3 protrude beyond the end faces of the nipple as in FIG. 1, the embodiment of FIG. 2 is modified by making the inner tubes 4 and 5 of the respective electrode members so long that they protrude beyond the socket bottoms into the tubular lining 6 of the nipple 3.

Figure 3:
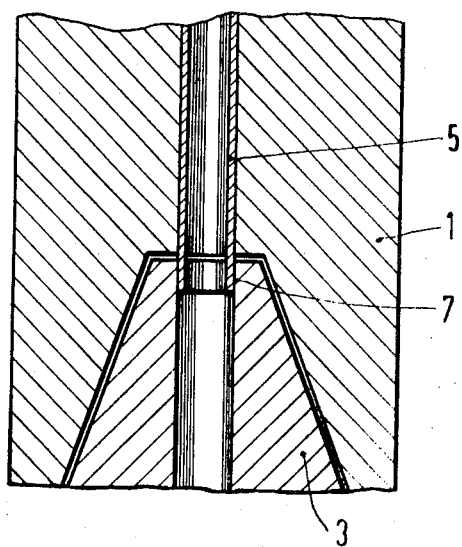

Instead of lining a nipple of carbon with a dense inner tube, the nipple may be dense throughout or at least in the regions near the surface. Thus, in the embodiment of FIG. 3, the double-conical nipple consists throughout of graphite so that an inner tubular lining is not necessary. It is preferable in such cases to have the inner tube 5 of the electrode member protrude into the bore of the nipple 3 to secure a tight seal at the junction locality 7.

Figure 4:
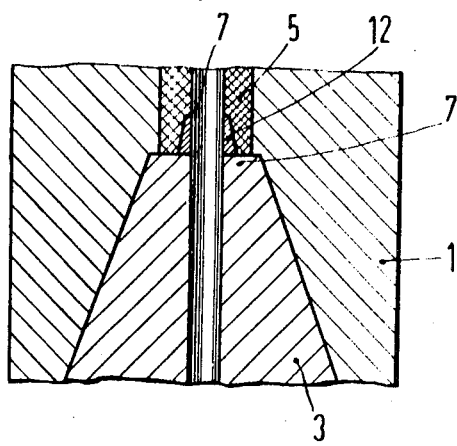

Another embodiment equipped with a nipple 3 consisting throughout of dense material is shown in FIG. 4. The nipple 3 has a conical extension 12 which protrudes into a mating conical recess in the end of the inner tube 5 with which the extension 12 is tightly joined.

Figure 5:
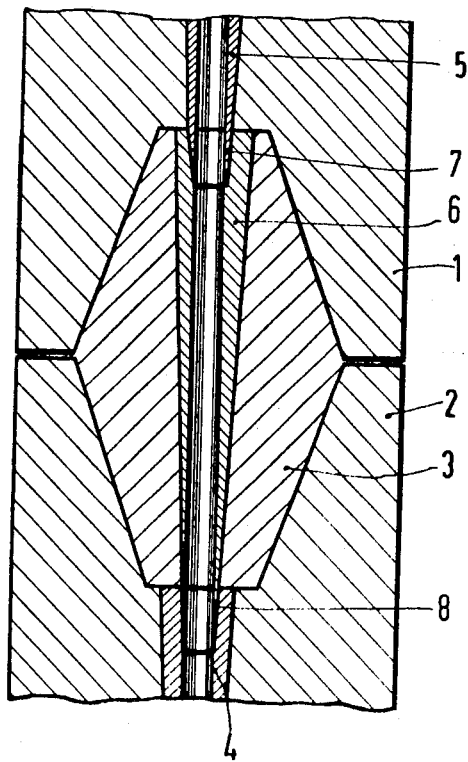

In the embodiment according to FIG. 5, the inner tubes 4 and 5 of the respective electrode members 1, 2 and the inner tube 6 of the nipple 3 are conical. The connection at the junction localities 7 and 8 is effected by inserting and wedging the protruding ends of the tubes 5 and 6 into the mating bores of the junction partner.

Figure 6:
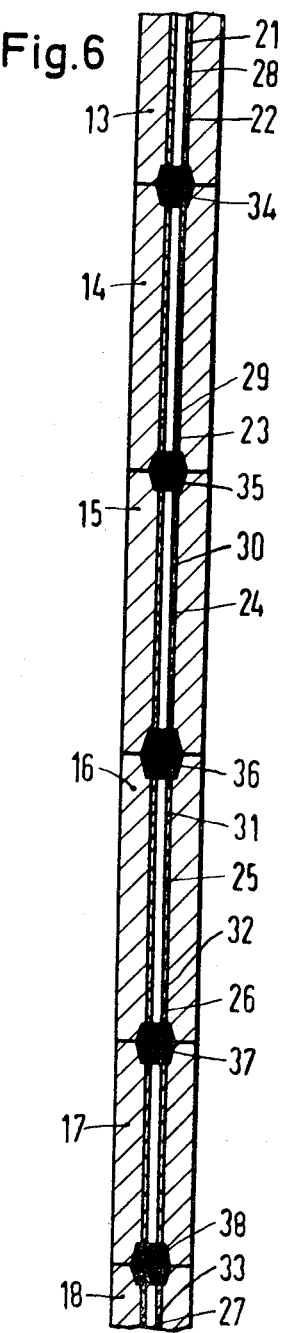
FIG. 6 illustrates, schematically and in section, a strand of electrodes in which the inner tubes of the electrode members are connected with each other independently of the nipple connections.

In the electrode strand shown in FIG. 6, the inner tubes 21 to 27 of the respective electrode members 13 to 18 are connected with each other independently of the nipple connections 34 to 38. The direct connection between the electrode members is effected by screwing them together, cementing them together, or press-fitting the adjacent members into each other. Originally, when assembling the strand of electrode members, the tubes 21 to 27 are not connected with the electrode members 13 to 18. The tubes are rather inserted into the electrode members only when the members are being interconnected by respective nipples, and the individual inner tubes 21 to 27 are then simultaneously joined with each other. In principle, the tubes 21 to 27 may have any desired length, this being exemplified in FIG. 6. Accordingly, the junction localities 28 to 33 may have an irregular distribution independent of the localities where the nipples 34 to 38 are situated. Thus, the individual inner tubes may be longer or shorter than the corresponding electrode members. However, to prevent the tubes from sliding through the electrodes, it is preferable to employ tubes whose thermal coefficient of radial expansion is larger than or equal to that of the electrode material. If the thermal coefficient of expansion is larger, then operational heat of the assembly will cause the tube to be pressed against the wall of the bores in the electrode and the nipple. If the coefficient of the tubes is the same as that of the electrode material, the higher temperature generated at the center axis of the electrode strand likewise results in causing the inner tubes to be pressed against the walls of the bores.

We claim:

1. A hollow electrode assembly comprising coaxially sequential electrode members with an axial through-bore and an inner tube of dense graphite lining said bore, a junction nipple having an axial bore and joining each two sequential electrode members, said inner tubes of said joined electrode members being gastightly connected with each other, said junction nipple consisting of dense graphite and having an axial center bore communicating with said inner tubes of the two joined electrode members.

2. In a hollow electrode assembly according to claim 1, said nipple being tightly joined with said respective inner tubes.

3. In a hollow electrode assembly according to claim 1, said electrode members having respective socket recesses engaged by said nipple, and a dense tube firmly seated in the bore of said nipple and tightly joined with said inner tubes of said electrode members, said inner tubes having a thermal coefficient of expansion at least as large as that of said electrode members.

* * * * *